March 17, 1970     H. G. SHIVELY     3,500,681
LOCATING MAXIMUM RADIAL FORCE VARIATION IN A TIRE Filed Aug. 12, 1968     3 Sheets-Sheet 1

INVENTOR
HARMON G. SHIVELY
BY W. A. Shira, Jr.
ATTY.

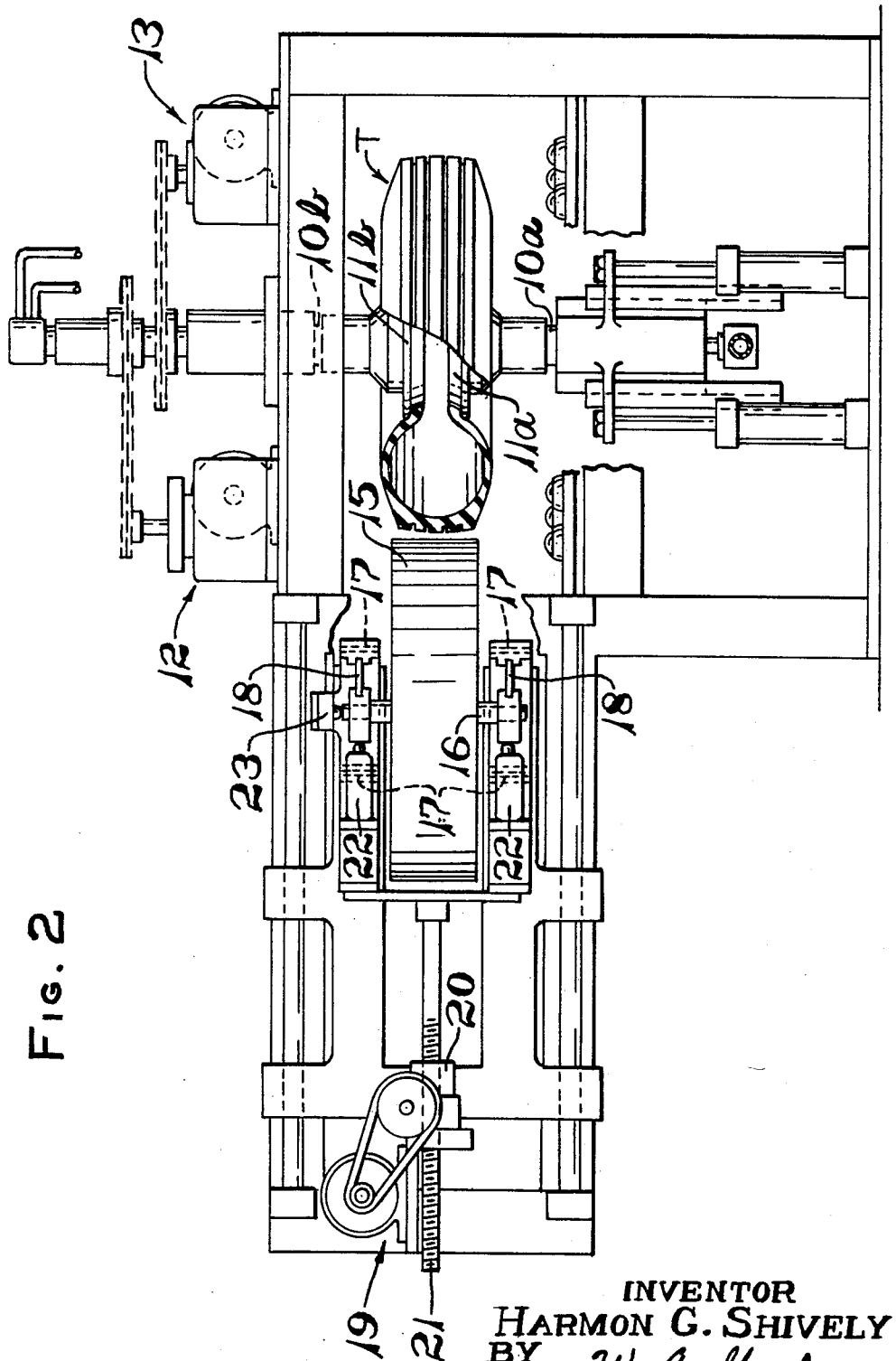

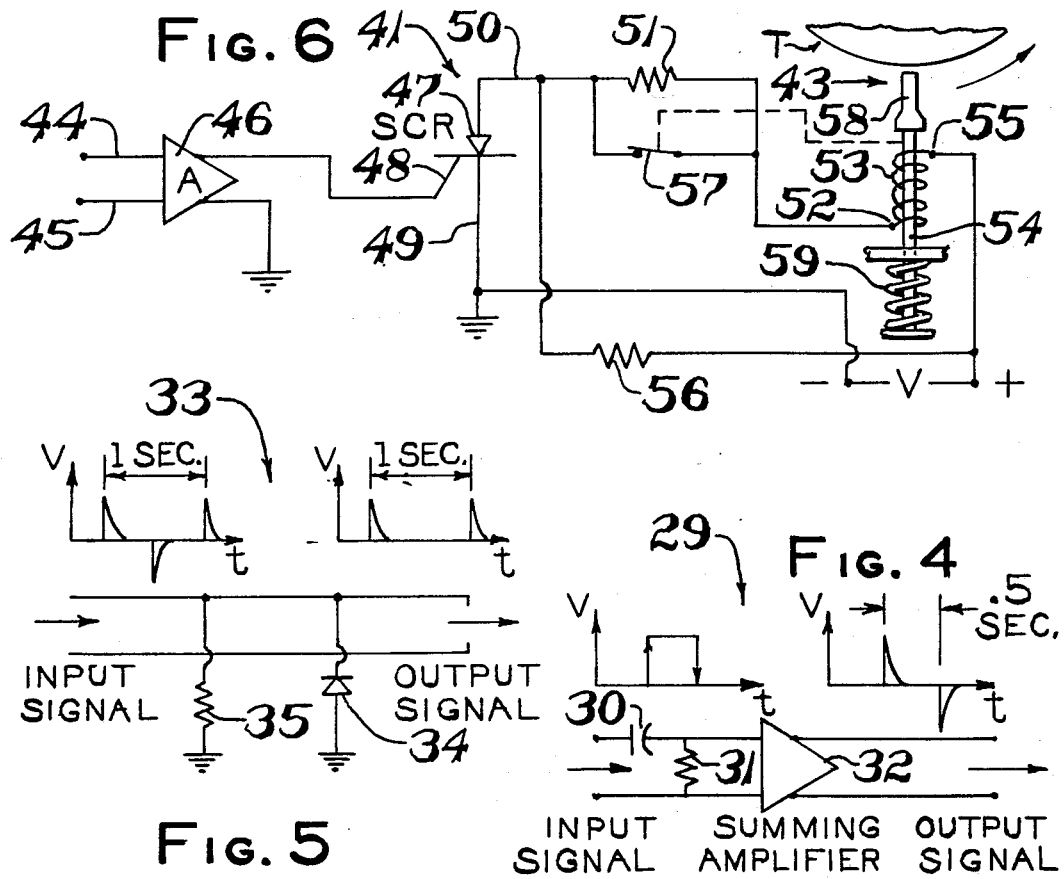
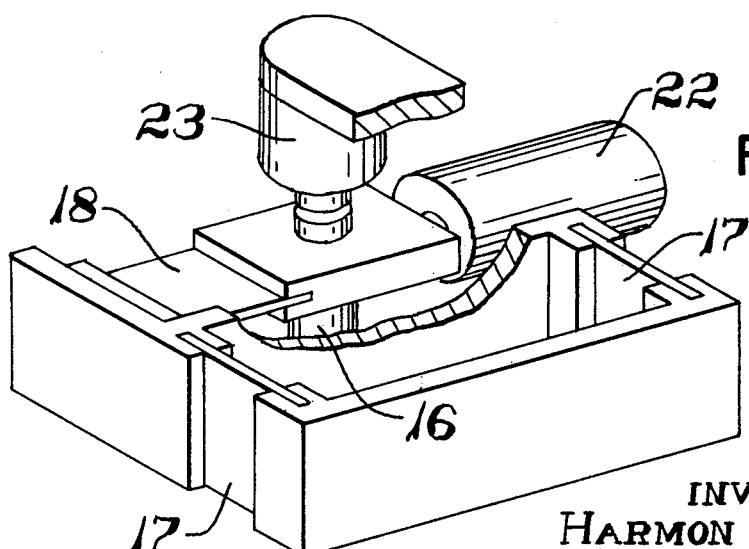

United States Patent Office
3,500,681
Patented Mar. 17, 1970

3,500,681
LOCATING MAXIMUM RADIAL FORCE VARIATION IN A TIRE
Harmon G. Shively, Tallmadge, Ohio, assignor to The B. F. Goodrich Company, New York, N.Y., a corporation of New York
Filed Aug. 12, 1968, Ser. No. 751,969
Int. Cl. B60c 19/10
U.S. Cl. 73—146    9 Claims

ABSTRACT OF THE DISCLOSURE

An apparatus for locating the region of the maximum radial force variation of a vehicle tire as it is rotated in contact with a load wheel that is supported for radial deflecting and provided with a load cell which produces force variation. The apparatus includes an electrical circuit which isolates from the output of the load cell the fundamental frequency and provides a signal which may either activate a counter for indicating the position of the maximum force variation with respect to the tire circumference for manually marking the tire or for activating a means for automatically marking the tire during rotation.

BACKGROUND OF THE INVENTION

It is essential that pneumatic tires for vehicles, such as passenger automobiles, exert a minimum force on the axle while running under load in order to prevent undesirable oscillations of the vehicle suspension. To produce this result, variation in the forces which are radially applied to the axle while the tire is rotating about the axle must be kept to a minimum. This requires that the pneumatic tires be manufactured within prescribed limits of eccentricity, radial carcass flex-stiffness and lateral oscillation. When such limits are exceeded, one method of removing prohibitive radial force variation of the finished tire is that of buffing or grinding rubber from the axial edges of the tread region of the tire in the region of the maximum radial force variation. This requires accurate location of that region.

The measurement of maximum radial force variation has heretofore been made by generating an alternating voltage in response to that variation which is indicated or recorded. While this provides an adequate determination of the amount of the radial force variation, it has been difficult to relate to the tire the location of the region thereof that produces the maximum force variation. Hence, it has been common practice to scrap or dispose of as "seconds" tires which exceed a predetermined minimum radial force variation rather than attempting to correct it by buffing or grinding, it being remembered that while the addition of balancing weights to the wheel and tire will correct rotational imbalance, it will not reduce radial force variation due to other causes such as non-uniformity in carcass flex-stiffness.

SUMMARY OF THE INVENTION

The present invention provides a unique system for locating and marking the location on a rotating tire corresponding to the region of its maximum radial dynamic force variation. The locating and marking are done simultaneously as the inflated tire is being rotated while a load wheel is urged into contact with the tread thereof so as to exert a radial force thereon. This causes a nominal amount of tire carcass deflection as the tire is rotated at a predetermined speed. Deflection sensors attached to the supports for the axle of the rotating load wheel provide a continuously varying electrical signal proportional to the lateral and axial movements of the load wheel axle. A control circuit alters the form of the signal to that of a fundamental sinusoidal waveform which is amplified to a square waveform and then differentiated to a series of spike pulses which are used to actuate an electrical trigger for energizing a marker actuating device, or starting a bidirectional counter. The counter, in conjunction with a means for providing a series of equal interval pulses during each revolution of the tire, permits a ready location of the region of maximum force variation, when the rotation of the tire is stopped, for manual marking or correction. The actuating device is operatively connected to a mechanical marker for contacting and marking the location of the point on the rotating tire coincident with the maximum amplitude of the fundamental frequency of the radial force variation.

The invention thus comprises, in combination with a means to produce an electrical signal indicative of the maximum radial force variation of a tire, a means for converting the said electrical signal to a plurality of pulses, each representative of the location of the said maximum force variation in a single revolution of the tire, which pulses are fed to a means rendered operative by such pulses to indicate the region of the circumference of the tire which resulted in production of the pulses.

BRIEF DESCRIPTION OF THE DRAWINGS

FIG. 2 is a side elevation view, with parts broken away, of a tire uniformity machine illustrating an inflated tire mounted for rotation and in position for contacting the load wheel;

FIG. 3 is an enlarged perspective view of a portion of the uniformity machine of FIG. 2 showing in detail the load wheel mouting and sensors;

FIG. 4 is a circuit diagram of the preferred form of the differentiator of FIG. 1;

FIG. 5 is a circuit diagram of the preferred form of the negative clipper of FIG. 1; and FIG. 6 is a circuit diagram of the preferred form of the trigger means and actuator and a schematic representation of the marker of FIG. 1.

DETAILED DESCRIPTION

Figure 1:
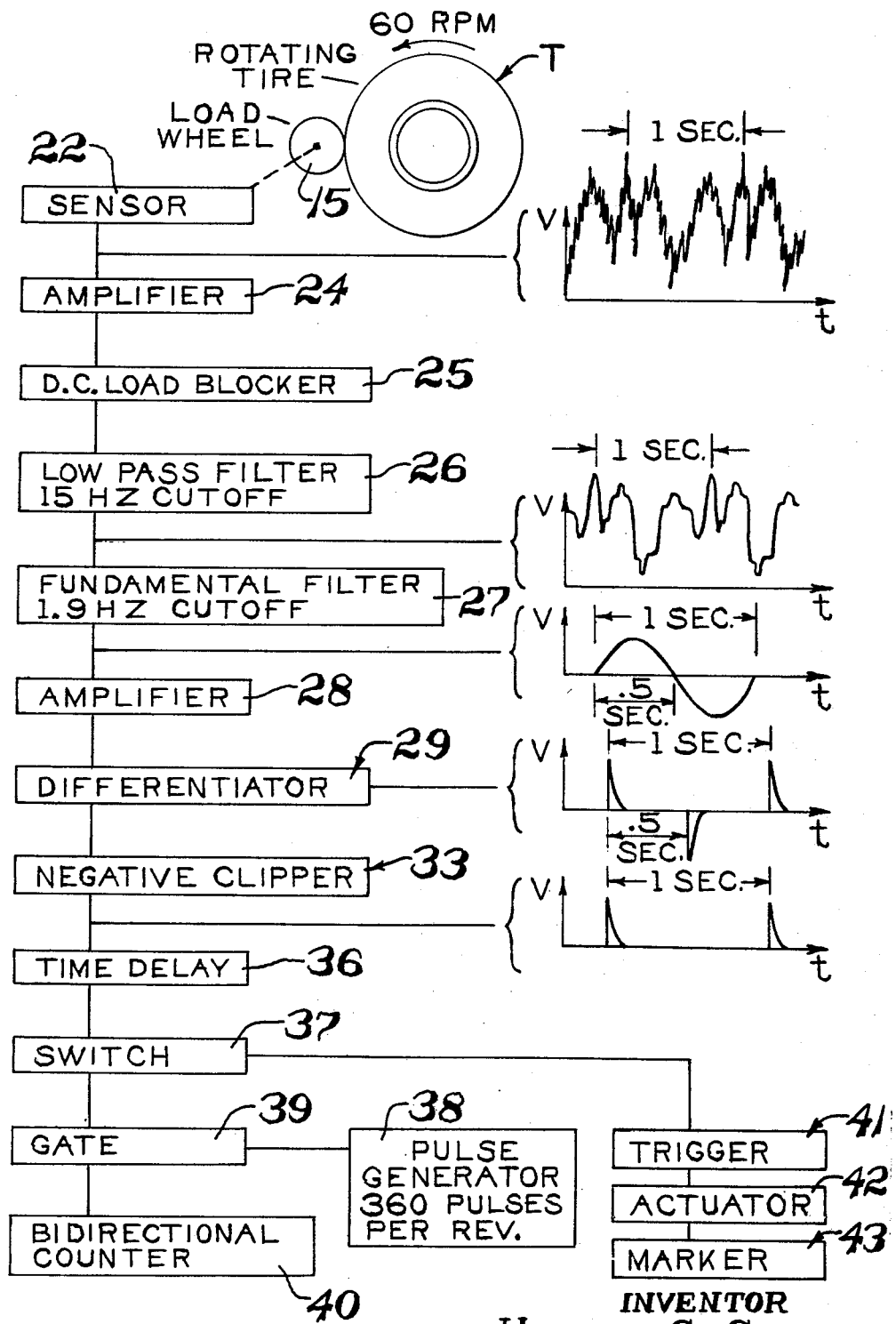
FIG. 1 is a block flow diagram of the control circuit with the electrical signal represented graphically at intermediate stages as a series of voltage versus time graphs.

Referring first to FIG. 2, there is shown a tire testing apparatus of the type disclosed and claimed in the copending application of Ralph F. Cooper and Otto E. Hermanns, Ser. No. 527,854, filed Feb. 16, 1966. In such an apparatus, the tire T to be tested is mounted between two bead-sealing chuck plates 11a and 11b which are supported for rotation in a horizontal plane by vertical shafts 10a and 10b thereby equalizing the effect of gravitational force on the tire. The shaft 10b is provided with conduit means through the tire T may be inflated and it, together with the tire are rotatable by either of two driving means 12 and 13. Loading and unloading of the tire is facilitated by mechanism for effecting axial movement of shaft 10a.

A load wheel 15 is rotatably mounted on an axle 16 which is secured to pairs of flex plates 17 and 18 which support the load wheel along a pair of mutually orthogonal axes one parallel to and one normal to the axle 16. The load wheel supports are mounted for movement in a horizontal plane to permit the load to be placed in tire-loading contact with the tire to be tested, such tire-load being effected by operation of mechanism 19 which comprises a power driven nut 20 threaded upon shaft 21. Sensors in the form of load cells 22 and 23 are attached to the flex plates, one on each plate, and provide an electrical signal proportional to the deflection of the flex plates.

The sensor 22, see FIG. 3, provides an electrical signal proportional to movement of the tire in a direction perpendicular to the axle 16. The electrical output signal of the load cell 22 is continuously varying during the rotation of the load wheel and indicates the level of all combined forces acting radially on the load wheel shaft 16. In the presently preferred practice of the invention the sensor 22 is a transducer of the strain gage type and emits a low level cyclic signal which requires amplification and filtering for removal of spurious responses and "hash" or unwanted random high frequency excursions. In the presently preferred form of the invention the sensor 22 of FIGS. 2 and 3 provide a signal of the order of 65 microvolts per pound of radial force variation. The output is amplified by a conventional amplifier 24, as shown in FIG. 1, to the order of 10 millivolts per pound of radial force variation. The amplified signal is then applied to a conventional capacitive blocking network 25 in which the D.C. power component of the signal is removed as will be readily understood. The signal is then fed to a low-pass filter network 26 which removes all "hash" or unwanted signal harmonics in excess of 15 Hz. The typical signal at this point is noticeably periodic having several major nodes as schematically illustrated in FIG. 1. The signal from the low pass-filter network is then applied to a fundamental filter 27 which removes frequencies above 1.9 Hz. to thus obtain the fundamental frequency, often called the first harmonic, of the radial force variation which is sinusoidal. This has a period of one second for the case where the tire T is rotated at a speed of 60 revolutions per minute or one rev./sec.

Due to the presence of capacitance in the filtering, maximum amplitude of the signal will generally be 90° out of phase with the maximum radial force variation. Thus, the point where the signal crosses the time axis represents the point of maximum radial force variation.

The sinusoidal waveform signal is then fed into a conventional amplifier 28 having a gain such that the signal voltage rises and decays at a high rate through the points of voltage reversal i.e. nearly perpendicular to the time axis. The amplifier is operated beyond cut-off so that the amplitude of the voltage is limited at a constant level, thus producing an alternating signal of substantially square waveform. In the presently preferred practice of the invention, the amplifier 28 comprises a two stage voltage amplification utilizing an inverting amplifier in each stage, with a voltage magnification of at least 100 in each stage. The first stage of amplification increases the rise and decay of the voltage to a steep slope. An overdriven amplifier is also used for the second stage of amplification which further shapes the signal to produce the substantially square waveform. The negative portion of the signal supplied to amplifier 28 is either removed therein or may be eliminated from the amplifier output by a separate clipper, not shown.

The square waveform signal pulses are then applied to a differentiator 29, which alters the form of the signal to that of a succession of substantially perpendicularly rising and exponentially steeply decaying spike pulses as illustrated in FIG. 1. Referring now to FIG. 4, the preferred form of the differentiator includes a capacitor 30 connected electrically in series and a resistor 31 connected electrically in parallel with a non-inverting summing amplifier 32. The combination of the capacitor 30, resistor 31 and amplifier 32 serve to perform the above-mentioned differentiating function on the square waveform signal. Thus, the signal voltage output from the capacitor 30 rises steeply in correspondence with the square waveform input signal and the value of resistance 31 is so chosen that the signal voltage decays from the capacitor in a very steep exponential curve, thereby producing a sharp spike waveform. Since the amplifier 32 is of the non-inverting type, it produces an output during both rise and decay of the pulse signal. This results in an alternating pulse signal having positive and negative voltage. Therefore, the signal output from the amplifier 32 is that of an alternating steep spike-pulse signal as shown in FIG. 4. In the presently preferred practice of the invention, the amplifier 32 need only amplify the magnitude of the voltage of the signal by a factor of 5.

The alternating spike pulse signal from the differentiator 29 is then applied to a negative clipper 33 for removing the negative voltage portion of the signal. In the preferred practice of the invention, the negative clipper 33, comprises, as shown in FIG. 5, a solid state diode 34 which is connected electrically in the circuit to one of the signal input conductors and to ground. Hence, the positive voltage portions of the signal provide a reverse bias on the diode so that it blocks any current flow to ground and the signal is transmitted unaffected. When the negative portion of the signal is applied to the diode, forward biasing occurs permitting current to flow to ground and therefor clipping of the negative portion of the signal results. The signal remaining and which is the output of the negative clipper 33 is, therefore, a succession of positive voltage spikes. A resistor 35 is connected electrically in parallel ahead of the diode 34, intermediate ground, and thereby serves as a bleed for feed-back from ground which prevents "ringing" in the amplifier during periods of current flow through the diode.

It is recalled that the signal output of each of the sensors 22 is proportional in voltage amplitude to the magnitude of the radial forces acting on the load wheel axle. In addition, the maximum signal is substantially in phase with the maximum radial force, inasmuch as the signal voltage reaches its maximum positive or negative value at substantially the same point in time that the radial force is maximum and the signal voltage crosses the zero level, e.g. point of voltage reversal, when the radial force is minimum. However, as mentioned above, after the signal has passed through the filter capacitor, a phase shift of substantially 90° occurs such that the signal voltage is substantially at the zero level when maximum radial force occurs. Furthermore, additional phase shift usually occurs through the various other components of the circuit. Therefore, it is necessary to synchronize the signal with the maximum radial force of the tire. For this purpose, the positive pulse spike signal of FIG. 5 is applied to a time delay 36. Any conventional electrical delay means may be used, for example a variable resistor network.

Referring again to FIG. 1, the synchronized spike signal from the time delay 36 is then applied through switch 37 selectively operable to conduct the signal to either a counter circuit for manual tire marking or to an automatic marker.

Where the tire is to be marked manually, a pulse generator 38 is provided for supplying 360 pulses per revolution of the tire. Preferably the tire is rotated at 60 revolutions per minute. The output of the pulse generator is fed to a conventional selectively conductive device or gate 39 which allows the pulses from generator 38 to pass only after receipt of the said spike pulse signal from the time delay 36. The pulse signals so permitted to pass, are fed to a bidirectional counter 40.

The operation of locating the point of maximum radial force variation is then as follows. With the switch 37 positioned for transmitting signal pulses to gate 39 the latter is actuated thereby so that the pulses from generator 38 operate counter 40. The rotating tire is brought to rest by a brake (not illustrated) within one or two revolutions after gate actuation. The counter 40 thus registers the number of time pulses that have elapsed since the application of the spike pulse. The tire is then rotated manually in the reverse direction the required number of degrees corresponding to the time pulses on the counter until the counter is thus reset to its initial reading. The point of maximum radial force variation will then be at this point and may be marked on the tire manually.

Where automatic marking is desired during tire rotation, the switch 37 of FIG. 1 is positioned to apply the spike pulse signal from the time delay 36 to a selectively conductive device or trigger 41 for energizing an actuator 42 which has a marker 43 attached thereto for marking the tire.

Referring to FIG. 6, wherein the preferred form of the circuit of the trigger 41 and actuator 42 are illustrated, the conductors 44 and 45 of the circuit extending from switch 37 conduct the spike pulse signal from the time delay 36. This signal is then applied to an amplifier 46 to increase the signal voltage level sufficiently to operate the trigger means. In the preferred practice of the invention a solid state silicon control rectifier (SCR) 47 provides the triggering; however, any convenient electrical trigger such as a multivibrator can be used. One lead of the amplifier output is electrically connected to the gate junction 48 of the SCR and the other circuit lead of the amplifier grounded. The negative voltage current carrying lead 49 of the SCR is connected to the negative terminal of a source of power V. The positive lead 50 from the SCR is electrically in series with a current limiting resistance 51 and one terminal 52 of a solenoid actuator 53 having an armature 54. The other terminal 55 of the solenoid is connected to the positive terminal of power source V.

The application of the spike pulse signal to the gate junction 48 of the SCR causes the gate to trigger the rectifier 47, and permit current to flow momentarily from the source +V through the solenoid 53 and to ground through the SCR thus energizing the solenoid armature 54. In the preferred practice, the source +V has a direct current potential of 160 volts. The resistance 51 is of low value on the order of .4K ohm and serves to protect the SCR 47 from excess current flow during the period when the rectifier is conducting.

A by-pass switch 57 is connected electrically in parallel with the resistor 51. The switch is normally closed with its movable pole operatively connected to the armature 54 of the solenoid as shown by the dashed line in FIG. 6. Upon triggering of the gate of the SCR 47, by the pulse signal, a high current flows through switch 57 allowing maximum current to flow for initial energizing of the solenoid 53. When the solenoid armature 54 has traveled a desired portion of its stroke, the armature 54 opens the switch 57 causing the current to flow through resistor 51 and therefore reduces the current flow through solenoid 53. Thus, the solenoid 53 receives initially maximum current for rapid movement of the armature, but the current is then stepped down for dwell during the period the armature is held in the actuated position. A resistor 56 of a high resistance, in the order of 1000 ohms, is connected from the lead 50 to the positive side of the voltage source V and serves as an energy absorber for "flywheel" dampening of the rapidly decaying inductive current of the solenoid 53 which occurs when the SCR 47 returns to its blocking mode after the gate is deactivated by passage of the pulse signal.

The armature of the solenoid has a marker 58 attached to one end thereof for marking the tire. The solenoid is positioned such that when the spike pulse signal energizes the solenoid 53, the armature 54 causes the marker 58 to move and contact the sidewall of the rotating tire T. When the spike pulse signal is not being applied to the solenoid coil, a return spring 59 returns the armature and marker to the initial position where it no longer makes contact with the surface of the tire.

The automatic marker 43 may be readily calibrated, to assure marking of the tire at the actual location of maximum radial force variation, by mounting a tire in the chucks 11a, 11b, rotating the tire at the desired speed, and making a mark on the tire with the automatic marker. The tire is then stopped, dismounted, inverted, demounted for marking on the opposite side. The tire is then rotated at the same speed and the time delay 36 adjusted until the mark coincides circumferentially with the position of the mark on the opposite side. The marker is thus synchronized to mark the tire at the correct circumferential station on the tire.

The present invention thus provides a means for sensing the radial force variation of a loaded rotating tire and providing an electrical signal proportional to the deflection of a load wheel with a control circuit for altering the signal to a form which can be: (a) applied to a trigger for energizing an actuator for operatnig an automatic marker for providing a mark on the rotating tire which coincides with the point of maximum radial force; or (b) applied to a gate for initiating a counter to register the number of degrees of tire rotation elapsed between occurrence of the signal produced by maximum radial force and the time to bring the tire to rest, whereupon the tire can be marked manually.

Adaptations and modifications of the invention may be made by those having ordinary skill in the art.

I claim:

1. A tire radial force variation determining apparatus comprising means to support and rotate a pneumatic tire, a rotatable load wheel exerting a radial load thereon, means mounting the load wheel for deflection in response to radial force variations of the tire, means responsive to said deflections to produce an electrical signal representative of said deflections, circuit means to convert said signal to a plurality of pulses each of which represents the location of the maximum radial force variation of the tire in a single revolution thereof, and means responsive to said pulses to indicate with reference to the circumference of the tire tested the position of the maximum radial force variation.

2. An apparatus as defined in claim 1 wherein said pulse responsive means includes an interval counter and means to initiate operation of said counter upon occurrence of one of said pulses.

3. An apparatus as defined in claim 1 characterized in that the said means for producing an electrical signal provides a continuously varying electrical signal output with the voltage amplitude proportional to the movement of said load wheel in a direction perpendicular to its axis and said circuit means includes:
   (a) filter means for removing the direct current voltage component of said varying voltage and providing a sinusoidal voltage of the fundamental frequency of said varying signal;
   (b) amplifying means for altering said sinusoidal signal such that said signal rises and decays substantially perpendicularly from the zero voltage level thereby forming an alternating positive and negative square waveform signal;
   (c) differentiating means for altering said square waveform to an alternating voltage sharp spike waveform signal, and
   (d) means for removing the negative voltage portion of said alternating spike waveform signal.

4. An apparatus as defined in claim 3, wherein said circuit further includes:
   (a) time delay means for synchronizing said spike signal with the rotation of said tire;
   (b) generator means for providing a signal of successive voltage pulses spaced equally in time;
   (c) counter means for recording the number of timed pulses generated; and,
   (d) gate means operative to initiate operation of said counter means upon application of one of said spike pulse signals for counting of said time pulses.

5. The means defined in claim 4, wherein said generator has an output of 360 pulses per revolution of said tire.

6. An apparatus as defined in claim 1, further characterized in that said means responsive to said pulses includes:
  (a) time delay means for synchronizing said pulses with the rotation of said tire;
  (b) means operative for marking on the rotating tire; and,
  (c) means operative to actuate said marker upon application thereto of one of said pulses to thereby mark on the tire.

7. The means defined in claim 6, wherein said actuator is a solenoid provided with an armature and having said marker connected to one end of said armature.

8. The means defined in claim 7, wherein said armature has a return spring for returning said actuator to its initial position upon deactivation.

9. The means defined in claim 6, wherein said means operative to actuate said marker is a solid state silicon control rectifier having a gate junction to which said pulse signal is applied.

References Cited

UNITED STATES PATENTS 3,412,615   11/1968   Nedley _____ 73—146 XR

DONALD O. WOODIEL, Primary Examiner

PO-1050
(5/69)

UNITED STATES PATENT OFFICE
CERTIFICATE OF CORRECTION

Patent No. 3,500,681     Dated March 17, 1970

Inventor(s) Harmon G. Shively

It is certified that error appears in the above-identified patent and that said Letters Patent are hereby corrected as shown below:

In the title ---Apparatus For--- should be inserted before "Locating".

Column 6, line 2, "demounted" should read ---remounted---.

SIGNED AND
SEALED
AUG 11 1970

(SEAL)
Attest:

Edward M. Fletcher, Jr.
Attesting Officer

WILLIAM E. SCHUYLER, JR.
Commissioner of Patents

Notice of Adverse Decision in Interference

In Interference No. 98,281, involving Patent No. 3,500,681, H. G. Shively, APPARATUS FOR LOCATING MAXIMUM RADIAL FORCE VARIATION IN A TIRE, final judgment adverse to the patentee was rendered Feb. 20, 1975, as to claim 1.

[*Official Gazette August 5, 1975.*]